April 14, 1959   F. L. PRENDERGAST ET AL   2,881,621
BI-DIRECTIONAL INCREMENTAL MOTION STEPPER MOTOR
Filed Aug. 22, 1955   2 Sheets-Sheet 1
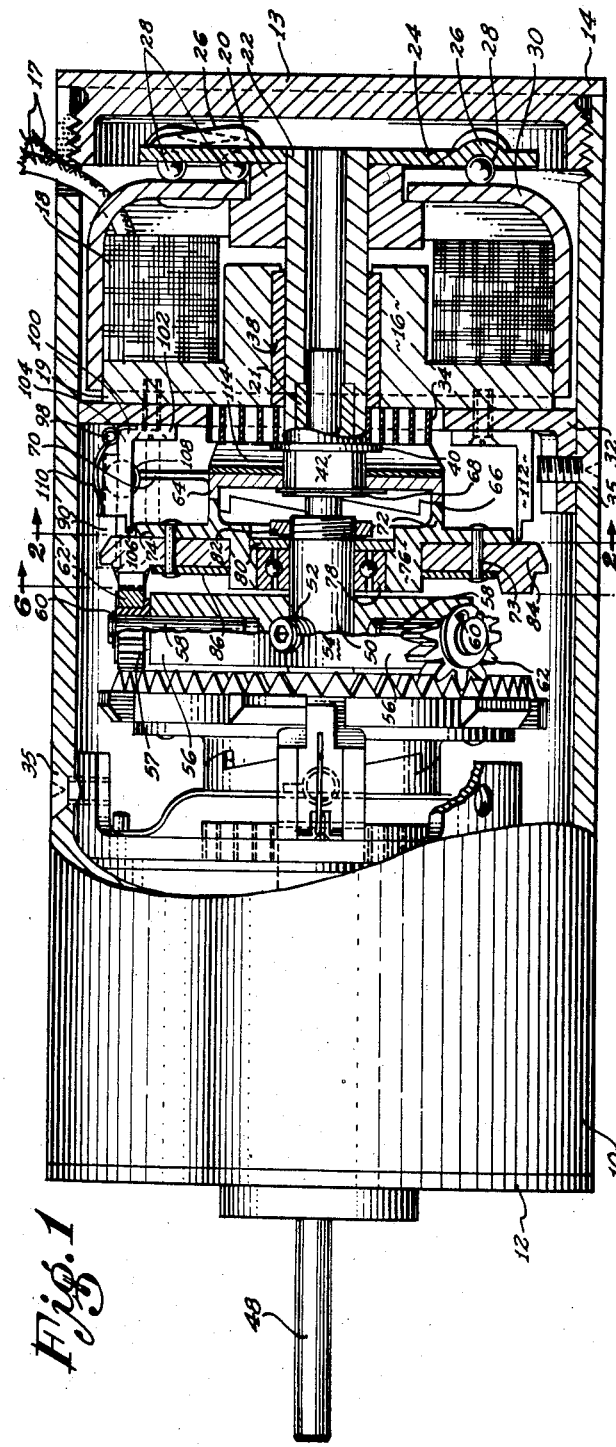
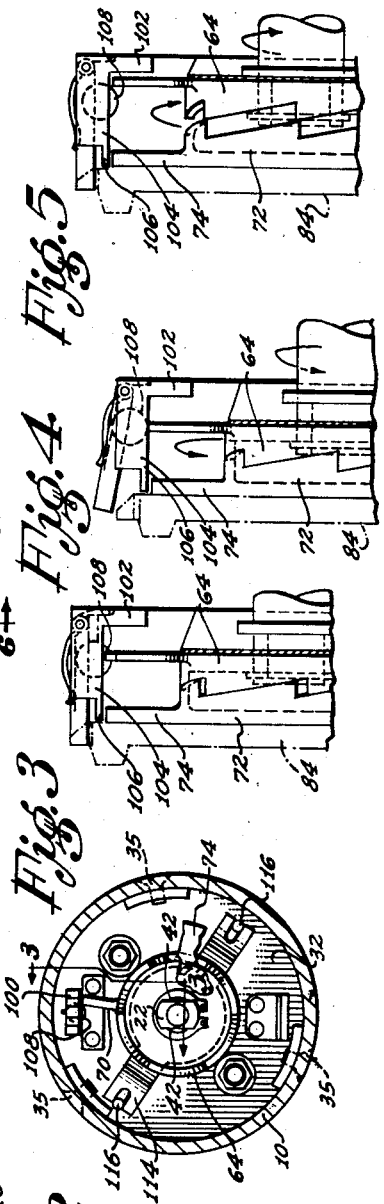
INVENTORS:-
Frank L. Prendergast
Norman Krasney
By Herbert E. Metcalf
Their Patent Attorney April 14, 1959   F. L. PRENDERGAST ET AL   2,881,621
BI-DIRECTIONAL INCREMENTAL MOTION STEPPER MOTOR
Filed Aug. 22, 1955   2 Sheets-Sheet 2
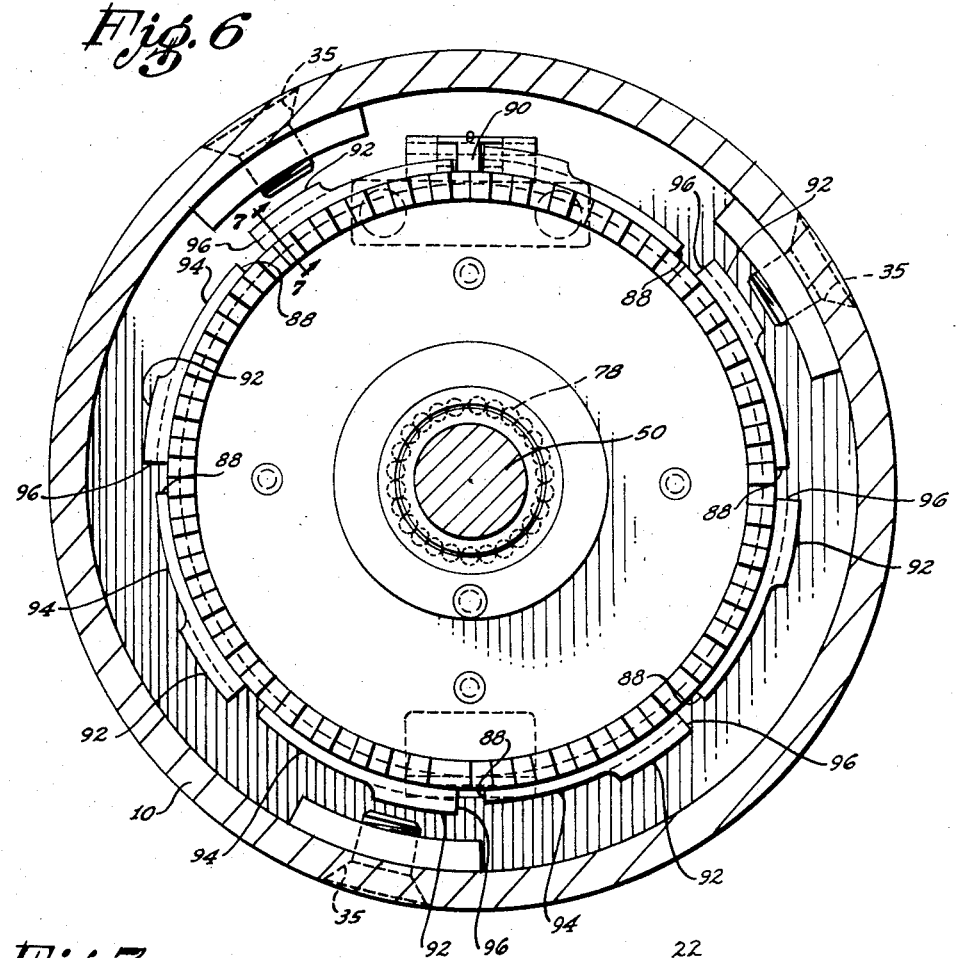
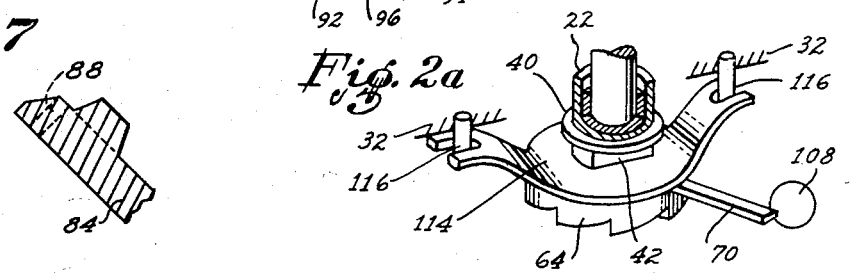
INVENTORS:
Frank L. Prendergast
Norman Krasney
By Herbert E. Metcalf
Their Patent Attorney United States Patent Office 2,881,621
Patented Apr. 14, 1959

2,881,621

BI-DIRECTIONAL INCREMENTAL MOTION STEPPER MOTOR

Frank L. Prendergast, Palos Verdes Estates, and Norman Krasney, Los Angeles, Calif., assignors to Northrop Aircraft, Inc., Hawthorne, Calif., a corporation of California Application August 22, 1955, Serial No. 529,858

6 Claims. (Cl. 74—126)

The present invention relates to devices operated by electrical pulses and more particularly described as a stepper or incremental motor.

In some stepper motors it is necessary to provide structure which may be rotated very accurately a defined distance for each pulse and preferably is adapted to be rotated in one direction or the other, or alternately in one direction and then the other, or any combination thereof depending on the manner in which the electrical pulses are transmitted to the device.

Stepper motors are used to control accurately functioning mechanisms such as computing devices, electrical relay systems that may be found in communication equipment, servo systems and similar applicable structure.

Devices of the kind to which this invention relates, should also be so constructed that they may be readily incorporated in place of other previously used devices in a wide variety of equipment and should be readily adapted to the special needs of whatever type of equipment the device is to be used. In addition, the stepper motor should be capable of operating on the electrical power provided.

Therefore, the principal object of this invention is to provide an electrical pulse actuated stepper motor which can be operated very accurately for an extended period of time without danger of missing any pulses.

Another object of this invention is to provide an electrical pulse actuated stepper motor capable of use in a variety of equipment, which may be readily actuated in one or the other direction, or alternately in one direction and then the other, or in any combination thereof.

Broadly the invention involves a bi-directional incremental motion stepper motor that may be energized by a force, preferably electrical, to cause an incremental rotation. The motor may be energized to rotate in either one of two directions or in two directions simultaneously. Further, the bi-directional stepper motor is provided with structure that insures that only one defined step of rotation is made at a time without there being inadvertent over-travel or reverse rotation.

Figure 1 is a fragmentary, cross-sectional view illustrating and having embodied therein the present invention, parts being broken away for purposes of clarity.

Figure 2 is a cross-sectional view taken transverse to the longitudinal axis on line 2—2 of Figure 1.

Figure 2a is a view illustrating the relationship of a leaf spring and locking pawl structure.

Figure 3 is a side elevation, generally schematic view, illustrating certain structure in a de-energized position.

Figure 4 is a view similar to Figure 3 but illustrating certain structure in one position of operation.

Figure 5 is a view similar to Figures 3 and 4 but illustrating certain structure in a position of operation more advanced than that shown in the two aforementioned figures.

Figure 6 is an enlarged, cross-sectional view taken on line 6—6 of Figure 1.

Figure 7 is a cross-sectional view taken on line 7—7 of Figure 6.

Referring to the drawings for a more detailed description of the preferred embodiment of the present invention 10 designates a cylindrical case having end caps 12 and 14 threaded thereinto. End cap 12 has an opening centrally located therein. That portion of the stepper motor to the left of the imaginary center line as viewed in Figure 1 is substantially identical to that to the right. Therefore, only one side will be described except where it is necessary to fully and completely describe essential structure in order that a completely operative device may be set forth, and it is to be understood that what is applicable to one side is equally applicable to the other.

The operational structure of the stepper motor comprises a solenoid assembly broadly designated 16, having electrical leads 17 attached to an electromagnetic solenoid coil 18; the latter being enclosed within and partially protected from moving structure by housing 19. The solenoid assembly is for the most part of conventional construction.

Associated with solenoid assembly 16 is a solenoid actuated armature 20, pressed or otherwise secured to a hollow, elongated shaft 22, and to which is secured an armature plate 24; the latter having a plurality of inclined arcuate grooves 26 formed therein, each one of which receives a ball 28. The balls 28 are held in the grooves by virtue of the fact that they are in continuous contacting relationship with structure 30. Secured to a slotted surface on armature shaft 22, is one end of a coiled flat, clock spring 34. The mounting cup 32 is attached to the cylindrical case 10 by screws 35. One end of the spring 34, opposed to that end secured to shaft 22 is secured to mounting cup 32. The solenoid shaft 22 is supported and rotates within a bearing 38.

Accordingly, when the coil 18 is energized, a magnetic force of sufficient magnitude is generated to draw armature 20 in toward the magnetic field and the coil 18. As the armature is drawn in toward the coil 18, the armature shaft 22 and armature 20 are caused to rotate due to the balls 28 operating in the grooves 26 in the conventional inclined plane principle. Upon de-energization of the coil 18, the shaft 22 and armature 20 are returned to their original position by the combined action of the spring 34, grooves 26 and balls 28.

The armature shaft 22 has a flange 40 thereon to assist in retaining the spring 34 properly positioned within mounting cup 32. Further, the armature shaft 22 has formed on the free end and that end remote from cap 14, a pair of opposed flats 42.

The bearing bushing 21, pressed into armature shaft 22, assists in supporting an elongated driven shaft 48; one end of the latter extends outwardly of the case 10 through the opening in cap 12. Located midway between the ends of the case 10 and retained on an enlargement 50 of the driven shaft 48 by a set screw 52 is a differential spider 54, having three hollow legs 56.

Secured within each leg 56 and extending outwardly therefrom is a shaft 58. Spaced from the legs 56, by a washer 57, and rotatable on the free end of shaft 58, and retained thereon by a split snap ring 60, is a pinion gear 62.

A driving, cup-type ratchet wheel 64 has an opening centrally located therein that is complementary to that end of shaft 22 having the flats 42. The ratchet wheel 64 is axially slidable on the free end of shaft 22. The free end of shaft 22 has a snap ring 68 thereon. Integral with the ratchet wheel 64 and extending perpendicular to the axis thereof is a projection or finger 70.

The driving ratchet 64 mates with a driven ratchet 72; the latter having an annular flange and a hollow hub 74 and 76 integral therewith. Pressed into the hub 74 is a bearing 78 that supports the driven shaft 48. The bearing 78 is retained in position in the hub by a washer 80 and a nut 82 threaded onto the enlargement 50 in the manner as illustrated in Figure 1 of the drawings.

The hub supports on the exterior thereof a face gear 84 that meshes with the pinion gears 62. The face gear 84, coupled with the spider 54, pinion gears 62, and associated structure, constitute the afore-referred-to differential.

The face gear 84 is secured to the annular flange 76 of the driven ratchet 72 by pins or rivets 73 extending through the flange 76, gear 72, and a washer 86; the latter also being supported by hub 74.

Attention is directed to the fact that there is a space between the teeth of the driving ratchet 64 and the driven ratchet 72 as these structures are viewed in Figure 1 of the drawings. Further, it is to be noted, by referring to Figures 1 and 3-6 inclusive, that the teeth of the face gear 84 are spaced inwardly from the perimeter or periphery.

Formed in the face gear 84 and on the periphery thereof are a plurality of notches 88 that receive an escapement or locking pawl 90. Between each pair of notches is a plateau 92 over which the pawl 90 is to be lifted, and adjacent each plateau 92 and notch 88 is an elongated depression 94 onto which the pawl 90 drops to be in position when the wall 96, defining, in part, the notches 88, is brought into engagement with the said pawl 90.

The pawl 90 is pivotally supported by a pin 98 on an L-shaped bracket 100. The short leg 102 has an opening therein through which a fastener extends to secure the bracket 100 to the mounting cup 32. The long leg 104 is U-shaped to form a pocket into which the pawl 90 seats when in the position illustrated in Figure 1 of the drawings. Further, on the free end of leg 104 is a guide lip 106 that limits the position of face gear 84.

Both the pawl 90 and leg 104 have openings therein to receive a ball 108. However, the opening in the leg 104 is smaller than the diameter of the ball 108. The distance of the ball 108 from the point of pivot 98 is approximately one-third of the distance of the ball 108 from the free end of the pawl 90. As a result, when the pawl 90 is lifted by finger 70 the ratio of lift at the ball 108 and free end of the pawl is approximately one to three. This ratio is sufficient to lift the free end of the pawl 90 out of the notches 88 and above the plateaus 92. Coiled about the pin 98, bearing against the cup 32 and the pawl 90 to urge the latter to the position illustrated in Figure 1 of the drawings, is a spring 110.

In opposed relationship to the L-shaped bracket 100 is another L-shaped guide bracket 112 that functions and performs in a similar manner to the lip 106.

Due to the fact that the driving ratchet 64 is axially slidable on shaft 22 a flat leaf spring 114 is located between the ratchet 64 and the cup 32. The spring 114 is bifurcated on each end in order to straddle spaced retaining pins 116, fixed to cup 32, and is bowed as may be determined by referring to Figure 1 of the drawings, in such a manner as to continuously bear against the driving ratchet 64 to urge it into meshing relationship with driven ratchet 72.

The operation of the invention is as follows: Assume the various elements of the stepper motor to be in the position illustrated in Figures 1, 2, 3 and 6. The teeth of the driving and driven ratchets 64 and 72 are in an overlapping but spaced apart relationship. The finger 70 on the driving ratchet is located on one side and in linear alignment with the ball 108 of the pawl 90 and the pawl is in a notch 88 to lock and prevent rotation of the face gear 84 and ultimately the driven shaft 48.

The solenoid coil 18 is energized through leads 17 to create a magnetic field into which is drawn the armature 20 and shaft 22. As a result, the shaft 22 is caused, through the medium of the grooves and balls 26 and 28 to rotate. This rotation is transmitted to the driving ratchet 64. Due to the fact there is a space between the teeth of the driving and driven ratchet 64 and 72 there is a lead in travel or lead in rotation before the effect of the rotation is actually transmitted to the driven ratchet. This lead in travel results in bringing projection or finger 70 into engagement with the ball 108 to lift pawl 90 out of the notch 88.

Attention is directed to the fact that although there is an axial movement of the armature shaft 22, this movement is not needed or used for the reason that the driving ratchet 64 is in engagement with the driven ratchet 72 and is axially independent of the said armature shaft.

Once the pawl 90 is lifted from notch 88 and above plateau 92 the lead in travel previously referred to is consumed and the teeth of the driving and driven ratches 64 and 72 are in mating relationship. Further rotation of the driving ratchet 64 is transmitted to the driven ratchet 72 and through the face gear 84, pinion gear 62, and driven shaft 48 to the load on the driven shaft. At the same time the finger 70 integral with the driving ratchet 64 is being carried in the same direction of travel.

Once the finger passes under and past the ball 108 the pawl 90 is urged by the spring 110 onto the plateau 92. As rotation of the face gear 84 continues the pawl is urged onto depression 94. With the pawl 90 in the last mentioned position it is in alignment with the wall 96 and this wall must strike the pawl 90. The result is that the pawl again is urged into a notch 88 and arrests further travel of the face gear 84 and driven shaft 48.

At the end of the driving rotation stroke, limited by the balls and grooves 28 and 26 and the armature shaft 22, ratchet 64 and finger 70 are urged under the impetus of spring 34 to return to the starting position. This return to the initial position results in bringing the teeth of the driving ratchet 64 back over the teeth of the driven ratchet 72. The contacting relationship established causes the driving ratchet to overcome the force of the spring 114 and movement of course is made a part of the movement of finger 70. In order to accomplish this the spring 34 must be capable of a greater force than the created friction restraining the teeth of the driving and driven ratchet 64 and 72, for the reason that the pawl 90 is locking the face gear against movement.

The axial movement, which in this instance is greater than that of the armature shaft, and rotary movement of the driving ratchet 64 results in bringing the finger 70 behind the ball 108 of the pawl 90 in the manner illustrated in Figure 5 of the drawings. As a result the pawl is not disturbed in its locking position.

On completion of the reverse rotation or return stroke of the driving ratchet 64 the teeth of the driving and driven ratchet 64 and 72 clear each other and the spring 114 urges the driving ratchet to move toward face gear 84 and into the position illustrated in Figure 3 of the drawings. The finger 70 is of course also returned to a position in linear alignment with the ball 108 of pawl 90. The operation just described may be applied to either side of the stepper motor to result in a bi-directional operation. Further, both sides of the stepper motor may be operated simultaneously due to the fact that a differential is the medium for transmitting a rotary motion to a driven shaft.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. An incremental motor comprising a case; an assembly in said case adapted to be rotatably energized by a force transmitted thereto; a shaft interconnected to and rotatable with said assembly; a spring loaded driving means on, reciprocable in two directions with respect to and axially slidable on said shaft; a driven assembly in continual contacting relationship and rotatable with said driving means; a locking element on said case that engages said driven assembly to limit the rotation thereof; and structure on said driving means that disengages said element from the driven assembly locking condition when the driving means is caused to rotate.

2. An incremental motor comprising a case; an assembly in said case adapted to be rotatably energized by a force transmitted thereto; a shaft interconnected to and rotatable with said assembly; a spring loaded driving means on, reciprocable in two directions with respect to and axially slidable on said shaft; a driven assembly interconnected to and rotatable with said driving means; a locking element on said case that engages said driven assembly to limit the rotation thereof; mechanism on said case and in engagement with said driving means for continually urging the latter into engagement with said driven assembly; and structure on said driving means that disengages said element from the driven assembly locking condition when the driving means is caused to rotate.

3. An incremental motor comprising a case; an assembly in said case adapted to be rotatably energized by a force transmitted thereto; a shaft interconnected to and rotatable with said assembly; a spring loaded driving means on, reciprocable in two directions with respect to and axially slidable on said shaft; a driven assembly in continual contacting relationship and rotatable with said driving means; a locking element on said case that engages said driven assembly to limit the rotation thereof; mechanism between said shaft and said driven assembly for transmitting the rotary motion of said shaft to said driven assembly; and structure on said driving means that disengages said element from the driven assembly locking condition when the driving means is caused to rotate.

4. An incremental motor comprising a case; an assembly in said case adapted to be energized by a force transmitted thereto to cause said assembly to rotate a defined part of a circle and return; a shaft interconnected to and rotatable with said assembly; a driving means rotatable with and axially slidable on said shaft; a driven assembly interconnected to and rotatable with said driving means; a locking element on said case that engages said driven assembly and is in part the cause of defining the said part of a circle; at least a pair of spaced plateaus between a pair of spaced depressions on said driven assembly engaged by said element that is in part the cause of defining said part of a circle; and structure on said driving means that disengages said element from the driven assembly locking condition when the driving means is caused to rotate said driven assembly.

5. An incremental motor comprising a case; an assembly in said case adapted to be rotatably energized by a force transmitted thereto; a shaft interconnected to and rotatable with said assembly; a spring loaded driving ratchet on and reciprocable in two directions with respect to said shaft; a driven ratchet assembly interconnected and rotatable with said driving ratchet; a locking element on said case that engages said driven assembly to limit the rotation thereof; and a projection on said driving ratchet that disengages said element from the driven ratchet assembly locking condition when the driving means is energized.

6. An incremental motor comprising a case; an assembly in said case adapted to be rotatably energized by a force transmitted thereto; a shaft interconnected to and rotatable with said assembly; a spring loaded driving ratchet on and reciprocable in two directions with respect to said shaft; a driven ratchet assembly interconnected and rotatable with said driving ratchet; a locking element on said case that engages said driven assembly to limit the rotation thereof; at least a pair of spaced plateaus between a pair of spaced depressions on said driven ratchet assembly engaged by said element; and a projection on said driving ratchet that disengages said element from the driven ratchet assembly locking condition when the driving means is energized.

References Cited in the file of this patent

UNITED STATES PATENTS

| | | |
|---|---|---|
| 2,209,858 | Steiert | July 30, 1940 |
| 2,496,880 | Leland | Feb. 7, 1950 |
| 2,682,775 | Thomas | July 6, 1954 |
| 2,668,785 | Cerutti et al. | July 6, 1954 |
| 2,706,259 | White | Apr. 12, 1955 |
| 2,763,793 | Krasney | Sept. 18, 1956 |
| 2,786,153 | Gates | Mar. 19, 1957 |